(12) United States Patent  
Kunz et al.

(10) Patent No.: US 6,471,275 B1
(45) Date of Patent: Oct. 29, 2002

(54) ELECTRONIC SLIDE-OUT ROOM SYNCHRONIZATION SYSTEM

(75) Inventors: James R. Kunz, Eugene; Brock E. Ferguson, Cottage Grove, both of OR (US)

(73) Assignee: Kwikee Products Co., Inc., Cottage Grove, OR (US)

( * ) Notice: Subject to any disclaimer, the term of this patent is extended or adjusted under 35 U.S.C. 154(b) by 0 days.

(21) Appl. No.: 09/730,908

(22) Filed: Dec. 5, 2000

(51) Int. Cl.[7] .................................................. B60P 3/34
(52) U.S. Cl. ...................... 296/26.01; 296/26; 296/171; 52/67
(58) Field of Search ................. 296/26.01, 26, 296/171, 26.13, 175; 52/67

(56) References Cited

U.S. PATENT DOCUMENTS

| | | | |
|---|---|---|---|
| 2,744,781 A | 5/1956 | Black | |
| 3,572,809 A | 3/1971 | Buland | |
| 4,128,269 A | 12/1978 | Stewart | |
| RE32,262 E | 10/1986 | Stewart | |
| 5,237,782 A * | 8/1993 | Cooper | 52/67 |
| 5,295,430 A * | 3/1994 | Dewald, Jr. et al. | 296/26 |
| 5,634,683 A | 6/1997 | Young | |
| 5,658,032 A | 8/1997 | Gardner | |
| 5,706,612 A * | 1/1998 | Tillett | 52/67 |
| 5,758,918 A * | 6/1998 | Schneider et al. | 296/26 |
| 5,785,373 A * | 7/1998 | Futrell et al. | 296/26.01 |
| 5,791,715 A * | 8/1998 | Nebel | 296/26 |
| 5,857,733 A * | 1/1999 | Dewald, Jr. et al. | 296/171 |
| 5,894,698 A | 4/1999 | Dewald, Jr. et al. | |
| 5,997,074 A | 12/1999 | Alexander | |
| 6,017,080 A * | 1/2000 | Gill | 296/171 |
| 6,048,016 A * | 4/2000 | Futrell et al. | 296/26.13 |
| 6,108,983 A * | 8/2000 | Dewald, Jr. et al. | 52/67 |
| 6,116,671 A * | 9/2000 | Schneider | 296/26.01 |
| 6,152,520 A * | 11/2000 | Gardner | 296/175 |
| 6,234,566 B1 * | 5/2001 | Cyr et al. | 296/171 |
| 6,345,854 B1 | 2/2002 | McManus | |
| 2002/0060467 A1 * | 5/2002 | McManus | 296/26.13 |
| 2002/0070700 A1 * | 5/2002 | McManus et al. | 296/26.01 |
| 2001/0030437 A1 * | 10/2002 | Hiebert et al. | 296/26.01 |

* cited by examiner

Primary Examiner—Kiran Patel
(74) Attorney, Agent, or Firm—Christensen O'Connor Johnson Kindness PLLC

(57) ABSTRACT

An electronic slide-out room synchronization system is provided to synchronize multiple actuators of a slide-out room so that the slide-out room has accurate alignment during extension or retraction while further providing a proper seal at full extension or retraction. The system comprises two linear actuators such as lead screw mechanisms or hydraulic cylinders in communication with a controller activated by an activation or room switch located inside a recreational vehicle. The linear actuators, when signaled via the controller, move the slide-out room between a retracted position and an extended position. If the controller determines, by receiving signals from a sensor, that one of the linear actuators is moving faster or is extended or retracted further than the other linear actuator, the controller synchronizes the actuators so that they extend and retract in unison.

6 Claims, 15 Drawing Sheets

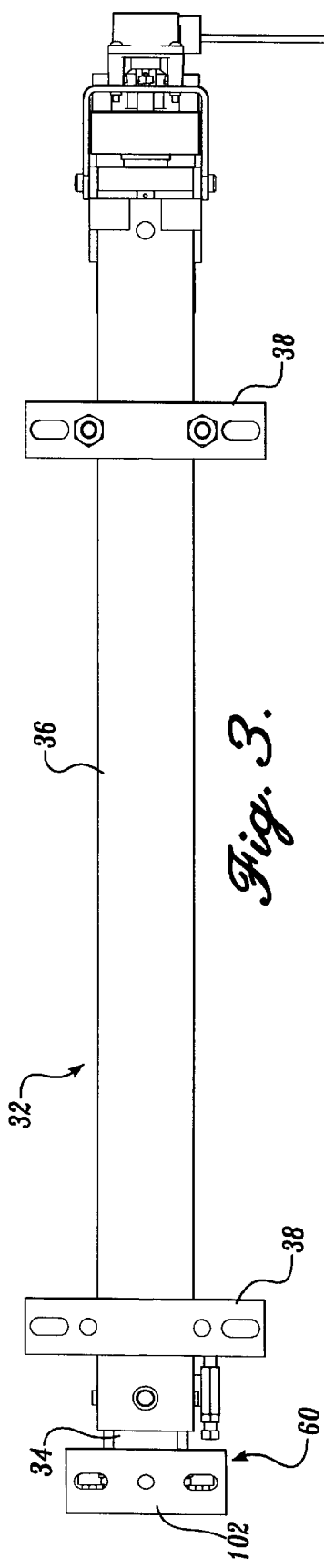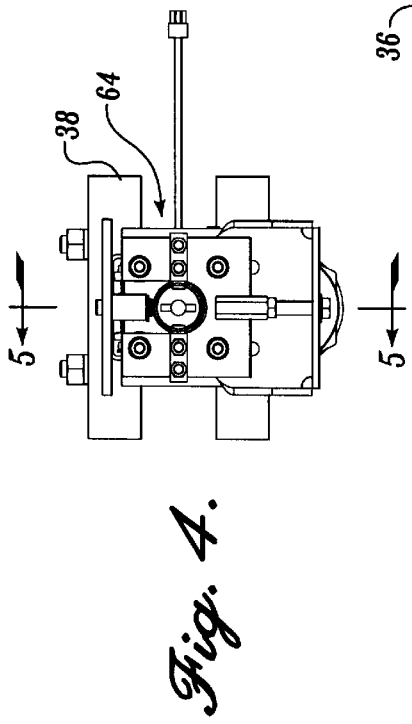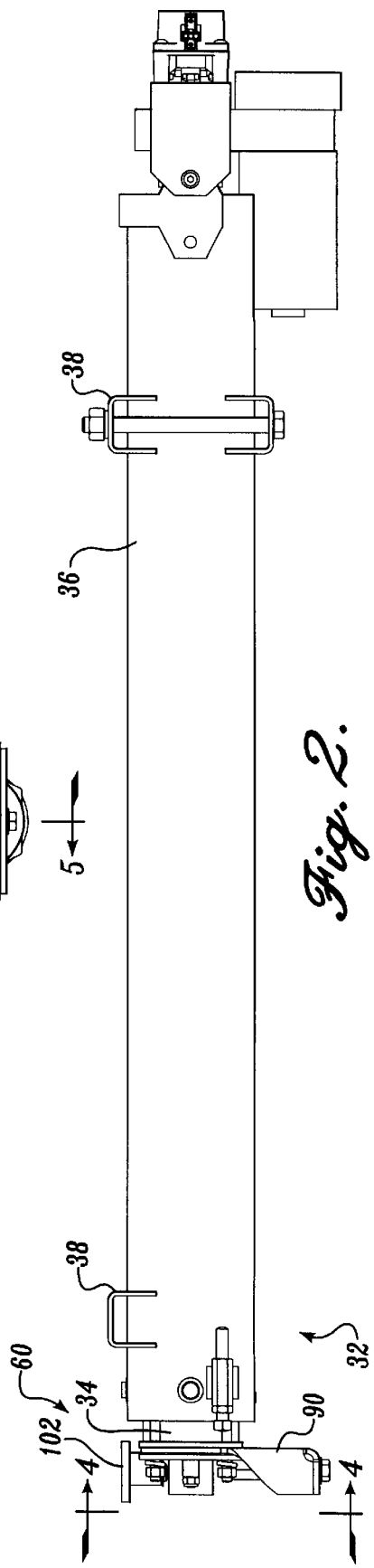

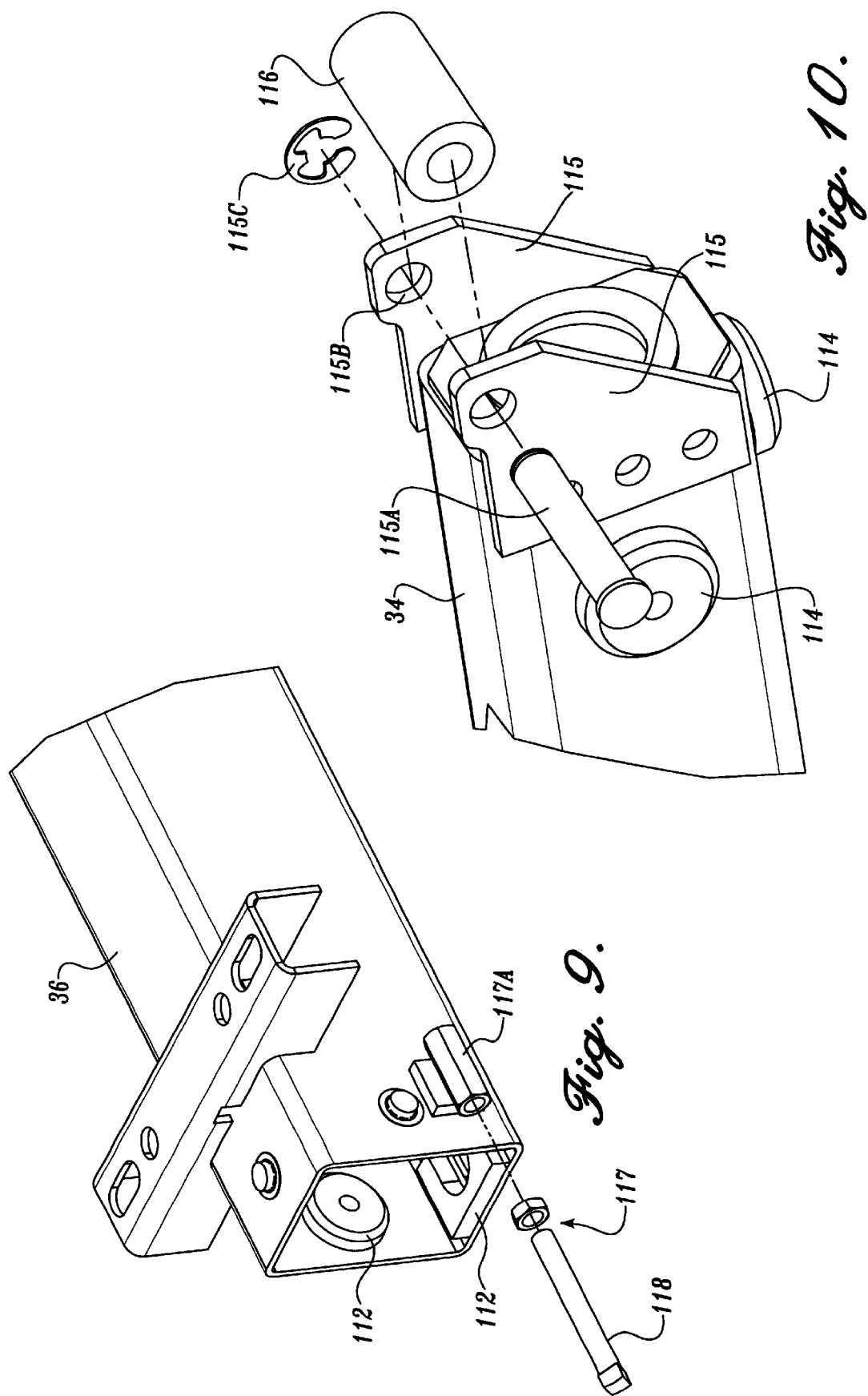

ELECTRONIC SLIDE-OUT ROOM SYNCHRONIZATION SYSTEM

FIELD OF THE INVENTION

The present invention relates to a system for synchronizing multiple linear actuators, and more particularly to a system for synchronizing multiple slide assemblies of a slide-out room of a vehicle.

BACKGROUND OF THE INVENTION

Various motorized and towable vehicles are known which have rooms or portions thereof that can be moved in an extended or retracted manner, in order to provide more internal useable space. In a typical structure shown in U.S. Pat. No. 5,785,373 to Futrell et al., one portion of a room is moveable and telescopingly received within the body of mobile vehicle. Similar structures can be used effectively in buildings, although for convenience, the discussion below focuses primarily on the vehicle examples.

Recreational vehicles have become extremely popular in recent years, and because of this popularity, a desire was needed for more livable space within these vehicles. Recreational vehicles are provided with extendable/retractable rooms for increasing the vehicle's livable space as shown in U.S. Pat. No. 5,634,683 to Young and U.S. Pat. No. 3,572, 809 to Buland. The slide-out room is typically extended for use when the vehicle is parked and retracted in a telescoping manner when the vehicle is to be moved. Prior slide-out rooms have been extended and retracted by several actuating systems know in the art, such as linear actuators (hydraulic cylinders) as shown in U.S. Pat. No. RE 32,262 to Stewart, drive screws as shown in U.S. Pat. No. 5, 237,782 to Cooper, and chain mechanisms as shown in U.S. Pat. No. 5,997,074 to Alexander.

Actuating systems can utilize either single or multiple power inputs. The actuating systems typically operate on either a lower portion of the slide-out room adjacent to the floor, or an upper portion of the slide-out room adjacent to its roof. Multiple power input systems have been presented in an effort to eliminate excess mechanical wind-up that exists in single power input systems that link multiple actuators together. Additionally, multiple power input systems have been presented to reduce the use of any cross shafts or hydraulic lines. This provides for added space for such improvements such as storage, larger living space within the slide-out room and the like.

However, prior art actuating systems for slide-out rooms whether using single or multiple power input systems have suffered from continuing deficiencies. For example, it has been difficult to properly seal the slide-out room with the body of the recreational vehicle because both sides of a slide-out room seldom extend/retract perfectly flush with respect to the body of the recreational vehicle. Also, do to inaccuracies in the manufacturing process, a slide-out room maybe "out of square" (a condition when both sides of the room do not meet the front of the room at 90 degrees). Also, in the prior art, it was difficult to extend/retract the actuators at the same speed, causing one actuator to often be extended/retracted further than the other. This causes misalignment in the slide-out room, resulting in the slide-out room being jammed during the extension/retraction of the slide out room.

Therefore, there is presently a desire in the recreational vehicle industry to provide a system that extends/retracts a slide-out room without the deficiencies discussed above.

SUMMARY OF THE INVENTION

In accordance with the present invention, a system is provided to address the deficiencies in the prior art. Specifically, a system is provided that synchronizes multiple actuators so that the slide-out room has accurate alignment during extension/retraction, and allows for proper sealing at full extension/retraction.

In accordance to an aspect of the present invention, a system is provided for synchronizing the operation of multiple actuators used to extend and retract a slide-out room of a vehicle. The system comprises a plurality of first members connectable to a chassis of the vehicle. A plurality of second members are attachable to the slide-out room. The second members are operably connected to and slidable within the first members. The system further comprises a synchronization sub-system where the synchronization sub-system operates to monitor and adjust the distance of travel of the second members with respect to the first members so as to enable the second members to extend or retract to a completed position.

In accordance to another aspect of the present invention, a slide-out room assembly is provided that comprises a slide-out room and at least two slide assemblies. Each slide assembly comprising a first slide member attachable to the vehicle and a second slide member operably connected to the slide-out room. The two slide members configured to slidably engage each other to extend and retract the slide assembly. The assembly also comprises a powered actuator for each slide assembly to move the first and second slide members of each slide assembly relative to each other. The assembly further comprises a synchronization system that is in communication with the powered actuators to monitor and control the operation of the powered actuator to cause the slide assemblies to extend and retract in unison.

In accordance with yet another aspect of the present invention, a system is provided for synchronizing the extension and retraction of a slide-out room of a vehicle. The system comprises a pair of slide assemblies. Each slide assembly comprising an outer tube member, and an inner tube member connectable to the slide-out room. The inner tube member is moveable to linearly translate within the outer tube member to extend and retract the slide-out room. The system further comprises a synchronization sub-system which comprises a controller. and an encoder assembly coupled to each slide assembly. The encoder assembly is in electrical communication with the controller. The synchronization sub-system operates to monitor and control the extension and retraction of the slide-out room.

In accordance to still yet another aspect of the present invention, a method is provided for synchronizing the operation of multiple actuators. The method comprises of activating the extension or retraction of the multiple actuators, monitoring the extension or retraction of the multiple actuators, and synchronizing the extension or retraction of the multiple actuators so as to cause the multiple actuators to extend and retract in unison.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 illustrates a side elevation view of a slide assembly shown in FIG. 1;

FIG. 3 illustrates a top view of the slide assembly shown in FIG. 2;

FIG. 4 illustrates an end view of the slide assembly shown in FIG. 2;

FIG. 9 illustrates a magnified perspective view of a portion of the outer tube of the slide assembly shown in FIG. 2;

FIG. 10 illustrates a magnified perspective view of a portion of the inner tube of the slide assembly shown in FIG. 6;

DETAILED DESCRIPTION OF THE PREFERRED EMBODIMENT

The present application relates to a system for synchronizing the extension and retraction of multiple linear actuators such as linear screw mechanisms, hydraulic actuators, and the like. Specifically, the present invention will be described in relation to a system for synchronizing the extension and retraction of multiple linear actuators of a slide-out room assembly of a recreational vehicle. As will be readily understood by one skilled in the relevant art, the present invention is not limited in its application to a slide-out room assembly of a recreational vehicle. Thus, it is to be understood that the disclosed embodiment is only by way of example and should not be construed as limiting.

Figure 1:
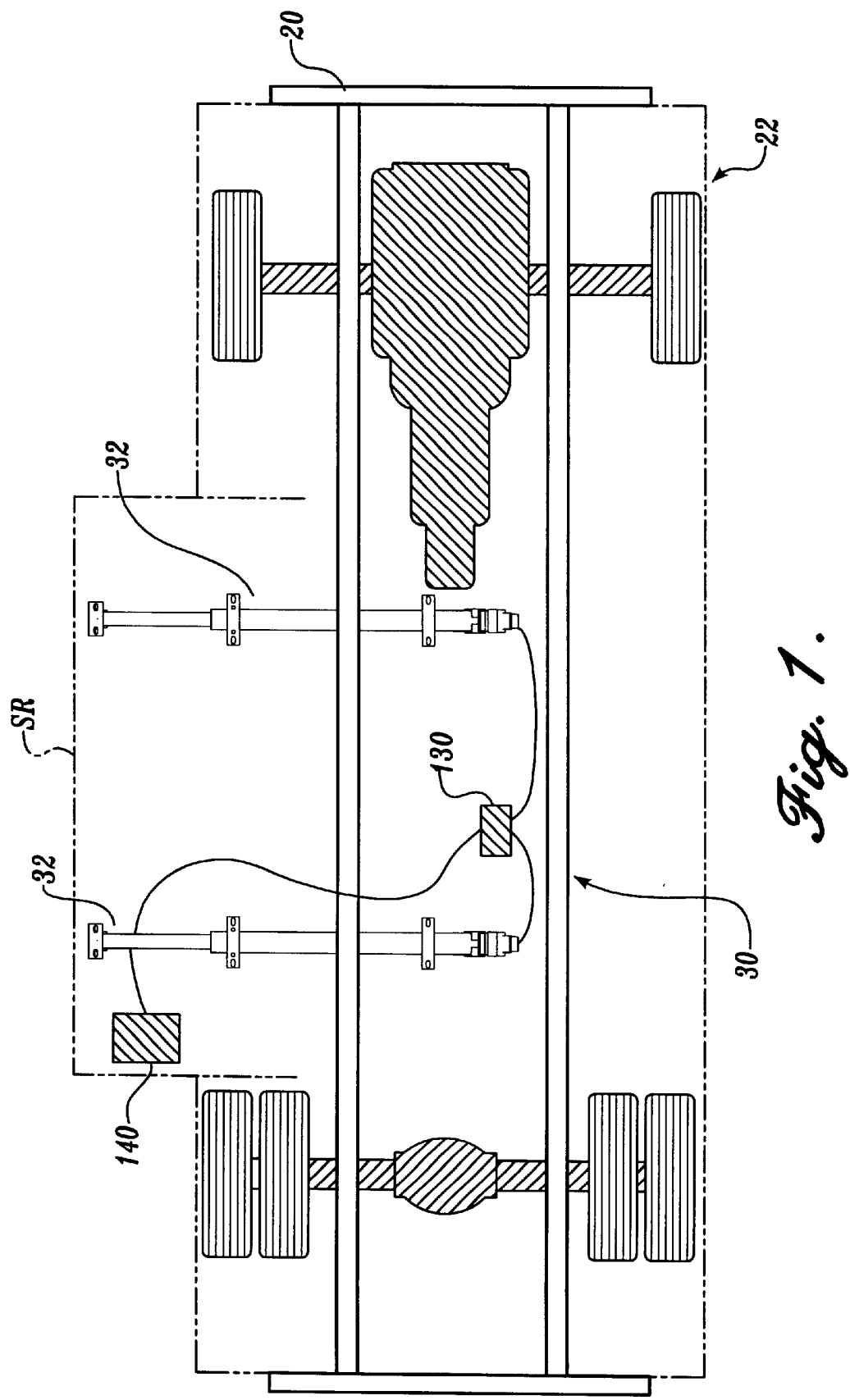
FIG. 1 illustrates a chassis of a recreational vehicle that includes an exemplary embodiment of the electronic slideout room synchronization system formed in accordance with aspects of the present invention.

Generally shown in FIG. 1, a chassis 20 of a recreational vehicle 22 includes an illustrative embodiment of the electronic slide-out room synchronization system 30 for extending/retracting a slide-out room SR in accordance with the aspects of the present invention. The system 30 is comprised of two linear actuators 32 in communication with a controller 130 activated by an activation or room switch 140 located inside the recreational vehicle. The linear actuators 32, when signaled via the controller 130, move the slide-out room between a retracted position and an extended position. If the controller 130 determines, by receiving signals from a sensor, that one of the linear actuators 32 is moving faster or is extended/retracted farther than the other linear actuators 32, the controller 130 synchronizes the actuators 32 so that they extend/retract in unison. In one embodiment of the present invention, the linear actuators 32 can be constructed in accordance to FIGS. 2–10, and are described in more detail below.

As shown in FIGS. 2–5, each linear actuator 32 can include an inner tube 34 reciprocally mounted within an outer tube 36, and a linear screw mechanism 40 to form a slide assembly 58 that extends/retracts the slide-out room of the recreational vehicle. The outer tube 36 includes two mounting brackets 38 for attaching to the chassis 20 of the recreational vehicle 22; however, it should be appreciated that any number of mounting brackets could be used. The linear screw mechanism 40 is mounted within the inner tube 34 and includes a lead screw 42 having outer screw threads 44 and a drive shaft portion 46. The linear screw mechanism also includes a protective tube or sleeve 48 journaled at an opening 50 (FIG. 10) of the proximal end 52 of the inner tube 34 and extends the length thereof. The linear screw mechanism 40 further includes a nut 54 secured to the inner surface of the proximal end of the protective sleeve 48 and meshed with the outer screw threads 44 of the lead screw 42. The protective sleeve 48 is connected to the inner tube 34 in a manner described below.

Figure 6:
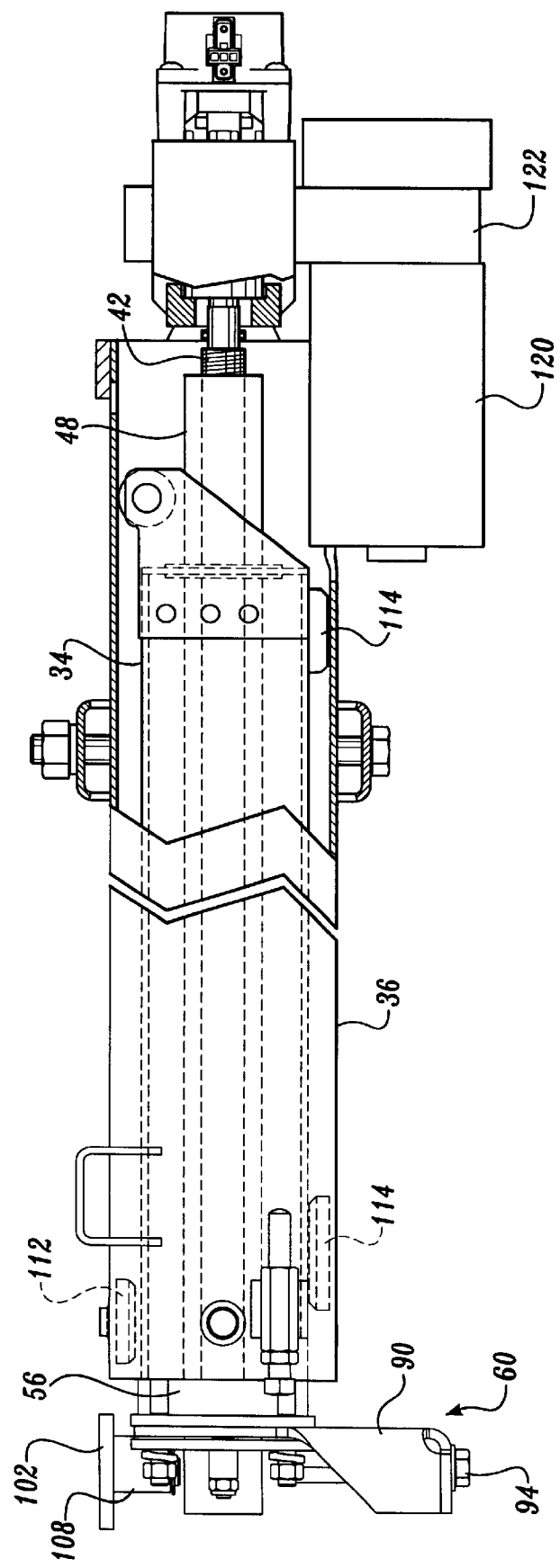
FIG. 6 illustrates a modified cross-sectional view of the slide assembly shown in FIG. 5.
Figure 7:
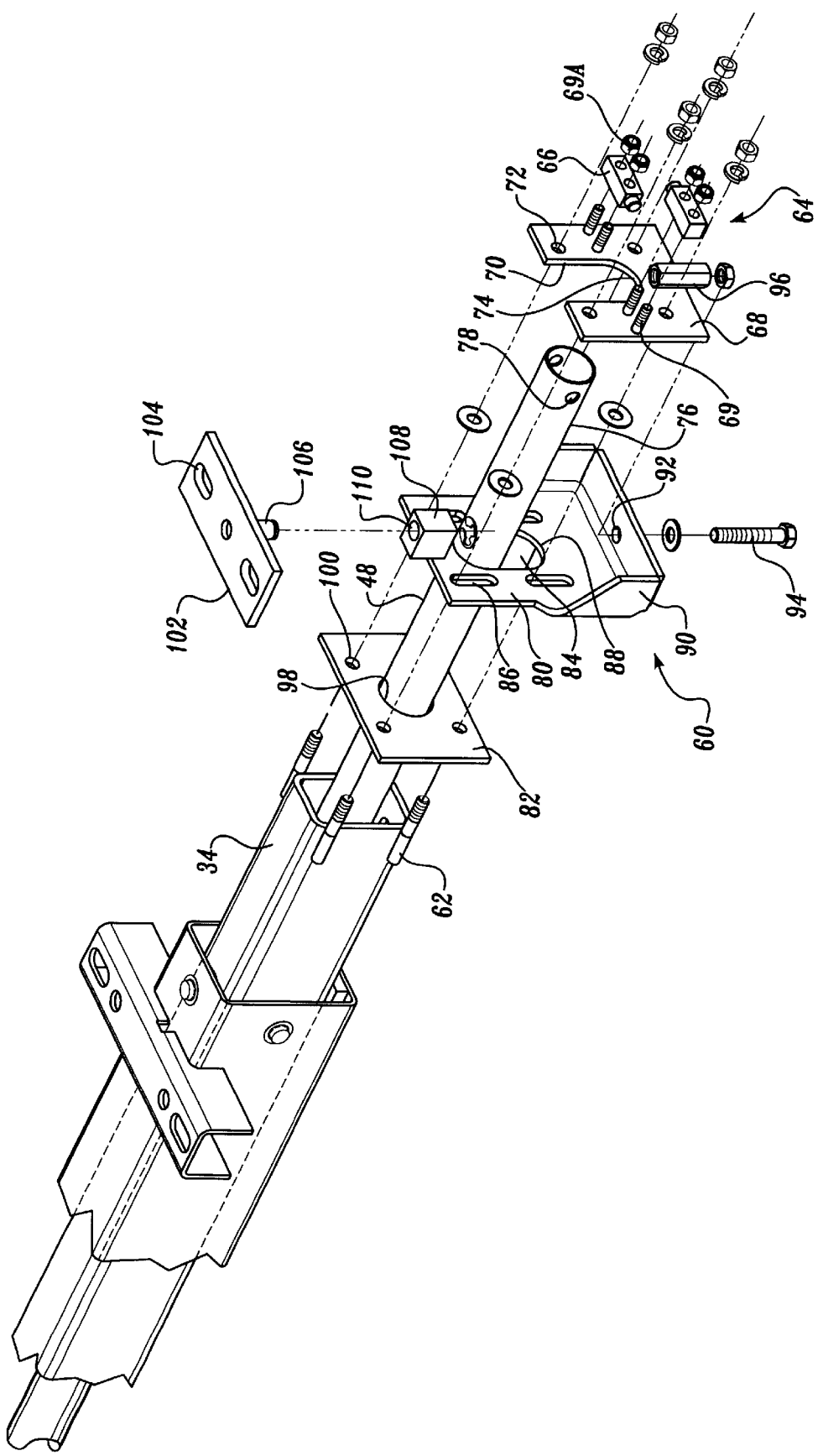
FIG. 7 illustrates an exploded view of the mounting assembly of the slide assembly shown in FIG. 2.

Referring now to FIG. 6, the distal end 56 of the inner tube 34 (shown as having a rectangular cross-section but can be of other cross-sectional shapes) terminates in a mounting assembly 60 for securing the reciprocating inner tube 34 to the slide-out room SR. As best shown in FIG. 7, the mounting assembly 60 is secured to the inner tube 34 through four bolts 62 attached to the outside surface of the inner tube 34. The mounting assembly 60 includes a clevis joint 64 (FIG. 4) that prevents the protective sleeve 48 from rotating with the lead screw 42. The clevis joint 64 consists of two blocks 66 secured to a front mounting plate 68 of the mounting assembly 60 by a pair of studs 69 extending outwardly from plate 68 to extend through aligned holes in the blocks 66. The blocks are held in place on studs 69 by nuts 69A. The front mounting plate 68 is rectangular in shape having a slot 70 that extends from the top of the mounting plate 68 to approximately the midpoint of the mounting plate 68. The front mounting plate 68 further includes four apertures 72 disposed around the slot 70 for receiving the corresponding bolts 62 of the inner tube 34. The base 74 of the slot 70 is arc-shaped to receive and support the distal end 76 of the protective sleeve 48. The blocks 66 are disposed at both sides of the arc-shaped end 74 of slot 70 with the rounded ends of the pins 66 extending inward toward the middle of the slot 70. The distal end 76 of protective sleeve 48 includes two diagonally opposed apertures 78 aligned with the rounded ends of pins 66. The rounded ends of pins 66 closely engage the corresponding apertures 78 so that the protected sleeve 48 is prevented from rotating relative to the inner tube 34 by the front plate 68 of the mounting assembly 60. As a consequence, the inner tube 34 extends/retracts with the reciprocation of the protective sleeve 48.

The mounting assembly 60 further includes a formed outer plate 80 and a rear plate 82. The pivot plate 80 is positioned in-between the front mounting plate 68 and the rear plate 82. The pivot plate 80 can be generally rectangular in shape and includes a vertically extending central oblong slot 84 and four vertically extending narrow slots 86 positioned on each side of the central aperture 84 for receiving the four bolts 62 secured to the distal end of inner tube 34.

The central aperture 84 has arc-shaped upper and lower ends 88 and is large enough for closely receiving the distal end 76 of protective sleeve 48 to extend therethrough and to move longitudinally relative thereto. The pivot plate 80 further includes a flange section 90 located along the lower side thereof and along the bottom thereof. The flange 90 extends perpendicularly from the plane of the pivot plate 80. Located at the middle of the lower flange 90 of the pivot plate 80 is an aperture 92 for receiving a jack bolt 94 that engages a corresponding nut 96 secured to the front mounting plate 68 just below the central aperture 84. See FIGS. 5 and 7. By using the jack bolt 94, the mounting assembly 60 can move vertically relative to the inner tube 34, allowing for adjustment of the mounting assembly relative to actuator 32 to accommodate variations in the location and construction of the slide-out room SR.

The rear plate 82 includes a central clearance aperture 98 for receiving the distal end of protective sleeve 48, and four smaller apertures 100 spaced around the central aperture 98 and aligned with the four slots 86 of formed pivot plate 80 for receiving the four bolts 62 of the inner tube 34.

Disposed at the top of the mounting assembly 60 is a rectangular top plate 102 that has two lateral slots 104 and a downward extending pin portion 106. A pin block 108 with a downward extending through bore 110 is secured to the pivot plate 80 directly above the upper arc-shaped end 88 of the central aperture 84 for receiving the downward extending pin portion 106 of the top plate 102. See FIGS. 5 and 7. The top plate 102 provides a connectable surface for connecting the mounting assembly 60 to the slide-out room SR. This arrangement allows the top plate 102 to rotate about the longitudinal axis of the downward extending pin portion 106 relative to pivot plate 80 to accommodate variation in the alignment of the slideout room relative to the vehicle on which it is mounted.

Referring to FIGS. 6 and 9, spacers 112 are mounted on the distal inside walls of outer tube 36 to allow the inner tube 34 to reciprocate within the outer tube 36 while preventing significant movement orthogonal to the translational direction of the inner tube 34. One spacer 112 is secured to each side of the rectangular outer tube 36. Referring to FIGS. 6 and 10, spacers 114 are also located at the proximal outside surface of the side walls and bottom wall of inner tube 34 to allow the inner tube 34 to reciprocate within the outer tube 36 while preventing significant movement orthogonal to the translational direction of the inner tube 34. A roller 116 is mounted to the proximal end of the inner tube 34 by side check plates 115. The roller 116 is rotatably mounted to plates 115 by an axle pin 115A extending through coupling clearance holes 115B formed in the upper corners of the check plates 115. The axle pin 115A is restricted from disengaging from the roller 116 by a u-ring 115C that engages within a groove extending circumferentially around the free end of the axle pin 115A. The roller 116 and spacers 114 allow the inner tube 34 to slide within the outer tube 36 in a guided manner.

As best shown in FIG. 9, an adjustment mechanism 117 is coupled to the outer wall of the distal end of the outer tube 36. The adjustment mechanism 117 includes an elongate nut 117A that may be secured to the outer tube 36, and a threaded, elongate bolt 118 (threads not shown in FIG. 9) insertable into the nut 117. The free end of the elongate rod extends toward the mounting assembly 60 (see FIGS. 2, 3, and 6) and abuts thereagainst when the slide assembly is in a fully retracted position. Thus, the adjustment mechanism 116 provides an adjustable stop position for determining the total travel distance of the slide-out room.

Figure 5:
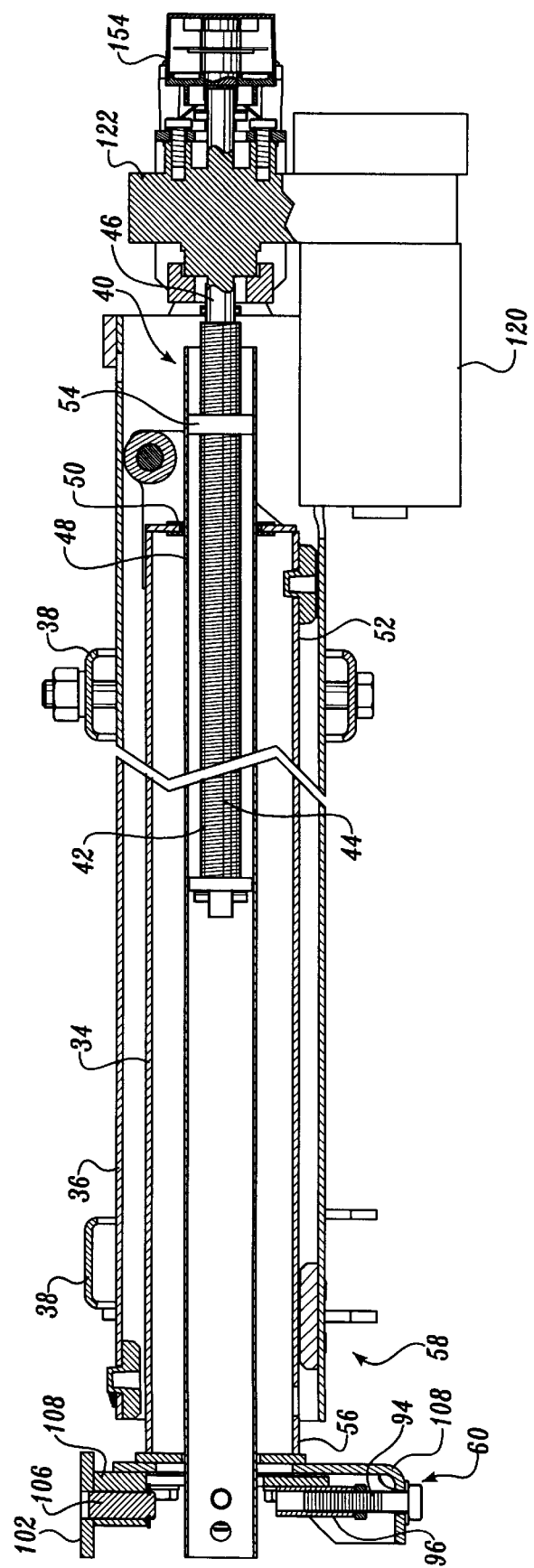
FIG. 5 illustrates a cross-sectional view of the slide assembly shown in FIG. 4 taken along line 5—5.
Figure 8:
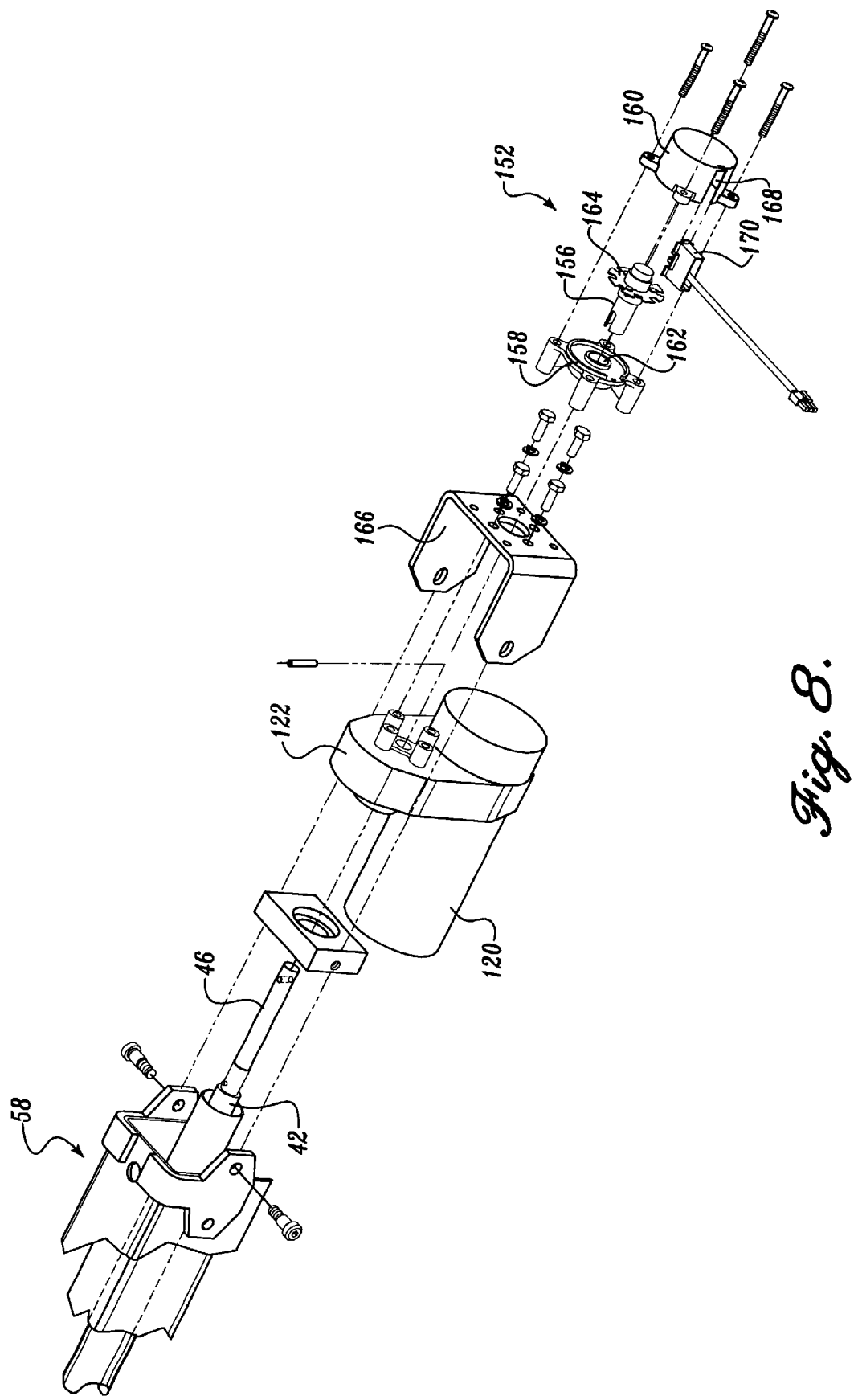
FIG. 8 illustrates an exploded view of the encoder assembly shown in FIG. 2 with aspects of the present invention.
Figure 11:
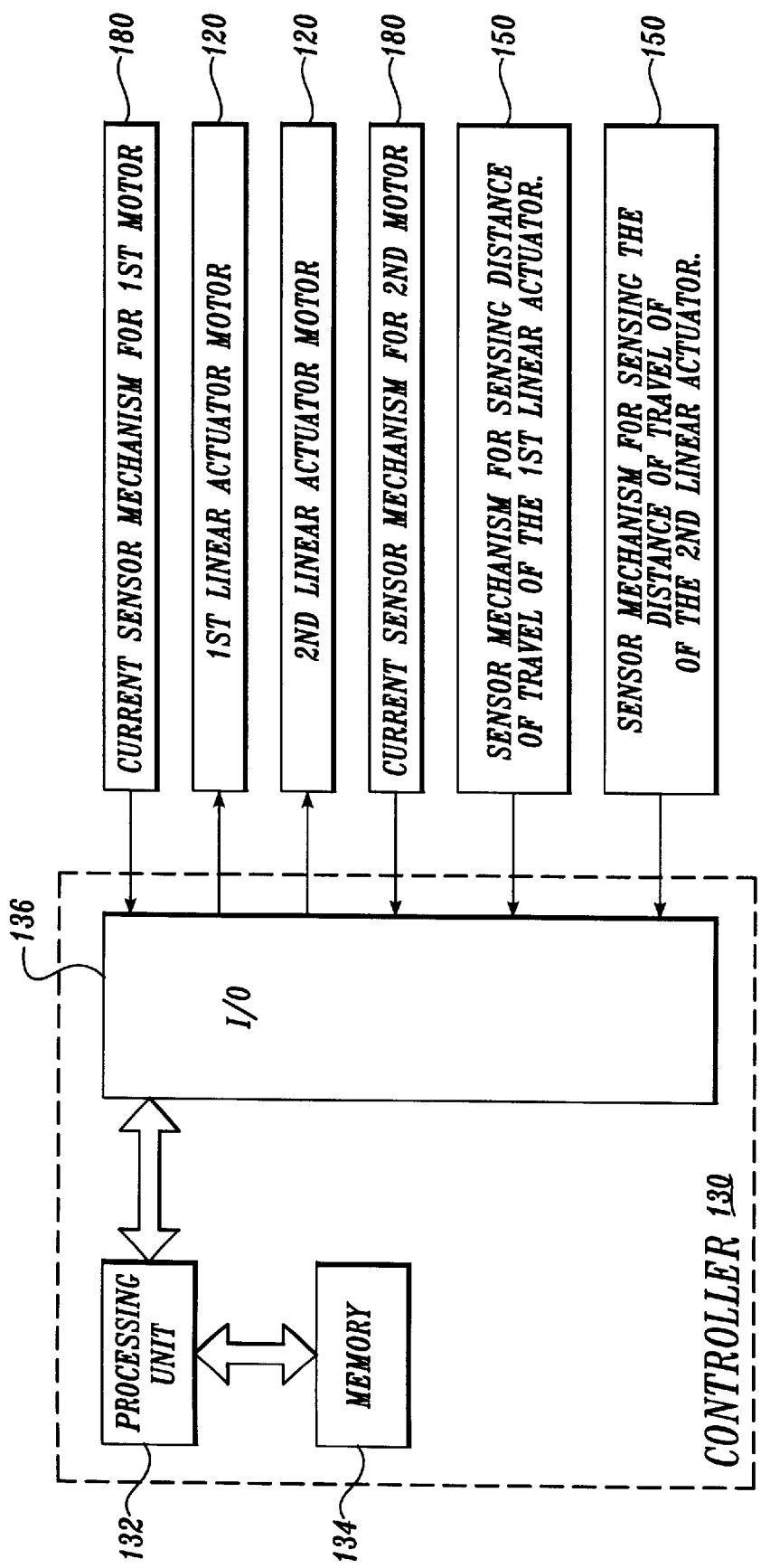
FIG. 11 illustrates a block diagram of the electronic slide-out room synchronization system in accordance with aspects of the present invention.

As best shown in FIGS. 5 and 8, to extend and retract the slide-out room, an electric motor assembly 120 can be operably coupled to each slide assembly 58 in a conventional manner such as through a combination of gears, chain drive, pulleys or the like. In the embodiment illustrated, one electric motor assembly 120 is coupled to each lead screw 42 through a combination of gears (not shown) disposed in a gear box 122 located at the proximal end of each slide assembly 58. Regardless of how the electric motor assemblies are coupled to each slide assembly, each electric motor assembly 120 is operated by drive signals from a controller 130 as illustrated in FIG. 11. The electric motor assembly 120 may, for example, be a stepping motor in which event the signals are pulses. The electric motor assembly 120 may also be a DC motor, for which the drive signals are voltages of appropriate levels applied to the motor for specific periods of time. The electric motor assemblies 120 receive signals from the controller 130 to rotate the lead screw 42 of each slide assembly 58 via the combination of gears. As the lead screw 42 rotates, the threads on the outer surface of the lead screw cause the nut 54 to linearly translate along the lead screw 42. Because the nut 54 is secured to the protective sleeve 48, the inner tube 34 (through its direct connection to the protective sleeve 48) telescopically translates within the outer tube 36. In order to retract each slide assembly, the electric motor assemblies are simply operated in reverse, which is accomplished in a conventional manner.

Referring to FIG. 11, the electronic slide-out room synchronization system 30 also contains a controller 130 in electrical communication with each electric motor assembly 120 and the room switch 140. The controller 130 includes a logic system for establishing whether the progress of each electric motor assembly is equal or within a predetermined threshold so that it may keep the extension/retraction of the slide assemblies in unison. It will be appreciated by one skilled in the art that the logic may be implemented in a variety of configurations, including but not limited to, analog circuitry, digital circuitry, processing units, and the like. In the embodiment illustrated in FIG. 11, the controller 130 includes a processing unit 132, a memory 134, and input/output (I/O) circuitry 136 connected in a conventional manner. The memory may included random access memory (RAM), read only memory (ROM), or any other type of digital data storage means. The I/O circuitry ordinarily includes conventional buffers, drivers, relays and the like, such as for supplying power to the electric motor assemblies.

The electronic slide-out room synchronization system 30 further contains two sets of sensor mechanisms 150, 180 in communication with the controller 130 as illustrated in FIG. 11. The first set of sensor mechanisms 150 output a signal to the controller 130 corresponding to the distance of travel of each slide assembly. Such sensor mechanisms are well known, and by way of example can be a hall effect type sensor, optical sensor, or a potentiometer, all of which can output a signal corresponding to the rotation of a shaft. Other sensors may be used to read the horizontal travel distance of the slide assembly. In the embodiment of the present invention illustrated in FIG. 8, the sensor mechanisms 150 comprise an encoder assembly 152 operably coupled to each of the slide assemblies 58. The encoder assembly 152, which is described in more detail below, creates a signal corresponding to the rotation of each lead screw 42 and transmits the signal output to the controller 130.

Referring back to FIG. 11, the second set of sensor mechanisms 180 output a signal to the controller 130 corresponding to current supplied to each electric motor assembly. A current rise occurs when the slide-out room is at full extension or retraction and the electric motor assemblies begin to stall. The stall condition of each electric motor assembly causes the amperage draw to the motors to rise, thus creating a change in current for the controller 130 to determine.

As best shown in FIG. 8, each encoder assembly 152 comprises a housing 154 (FIG. 5) which contains an encoder shaft 156 operably coupled to the lead screw 42, and a slotted disk 164 coupled on the outer surface of the encoder shaft 156. The housing 154 includes a housing proximal end structure 158 and a cylindrical cover or end cap 160. The housing end structure 158 has a centrally disposed clearance bore 162 to allow the drive shaft portion 46 to extend into the housing 154. The drive shaft portion 46 of lead screw 42 is coupled to the encoder shaft 156 so that the rotation of the lead screw 42 is transferred to the slotted disk 164. The cap 160 is fastened to the housing base member 158 and a gear box bracket 166 by elongate bolts. The cover or cap 160 further includes a slot 168 that extends the entire length thereof. The encoder assembly 152 further comprises a hall effect sensor 170 that extends through the slot 168 in the cover or cap 160 to engage with the controller. The cap 160 helps to prevent dust, dirt, or debris from interfering with the operation of the slotted disk 164 and the sensor 170. The encoder assembly 152 functions by rotating the slotted disk 164 through the sensor field causing the sensor 170 to create an output in the form of a pulsed signal (i.e. on, off, on, off, etc.) that can be read by the controller and stored in the memory.

Referring now to FIGS. 12A–12D, an exemplary embodiment of a process for synchronizing the linear actuators 32 in accordance with aspects of the present invention is shown. Generally described at block 200, the process for synchronizing the linear actuators 32 is started by receiving a signal from an activation switch 140. At block 202, after receiving a signal from the activation switch 140, the controller 130 transmits the appropriate signal to activate the linear actuators 32. The output signal from each sensor mechanism 150 is read by the controller 130 at the comparator block 204, and the controller decides whether the linear actuators 32 are out of sync. The controller 130 decides whether the linear actuators 32 are out of sync by comparing the difference in count values created by the output signals of each sensor mechanism 150 to a threshold value. At block 206, if the difference between the incremental counts of the linear actuators 32 is greater than the threshold level, the linear actuator 32 having the larger count value is shut down by the controller 130 until it receives another signal from the controller 130. Then, at block 208, the controller compares the count value of the slower linear actuator to the count value of the faster linear actuator, now shut down. The process returns to block 208, until the count values of the slower linear actuator and the faster linear actuator are equal. When this occurs, the controller 130 transmits a signal to the faster linear actuator, and the linear actuator is again operational to extend/retract at block 210.

Figure 12A:
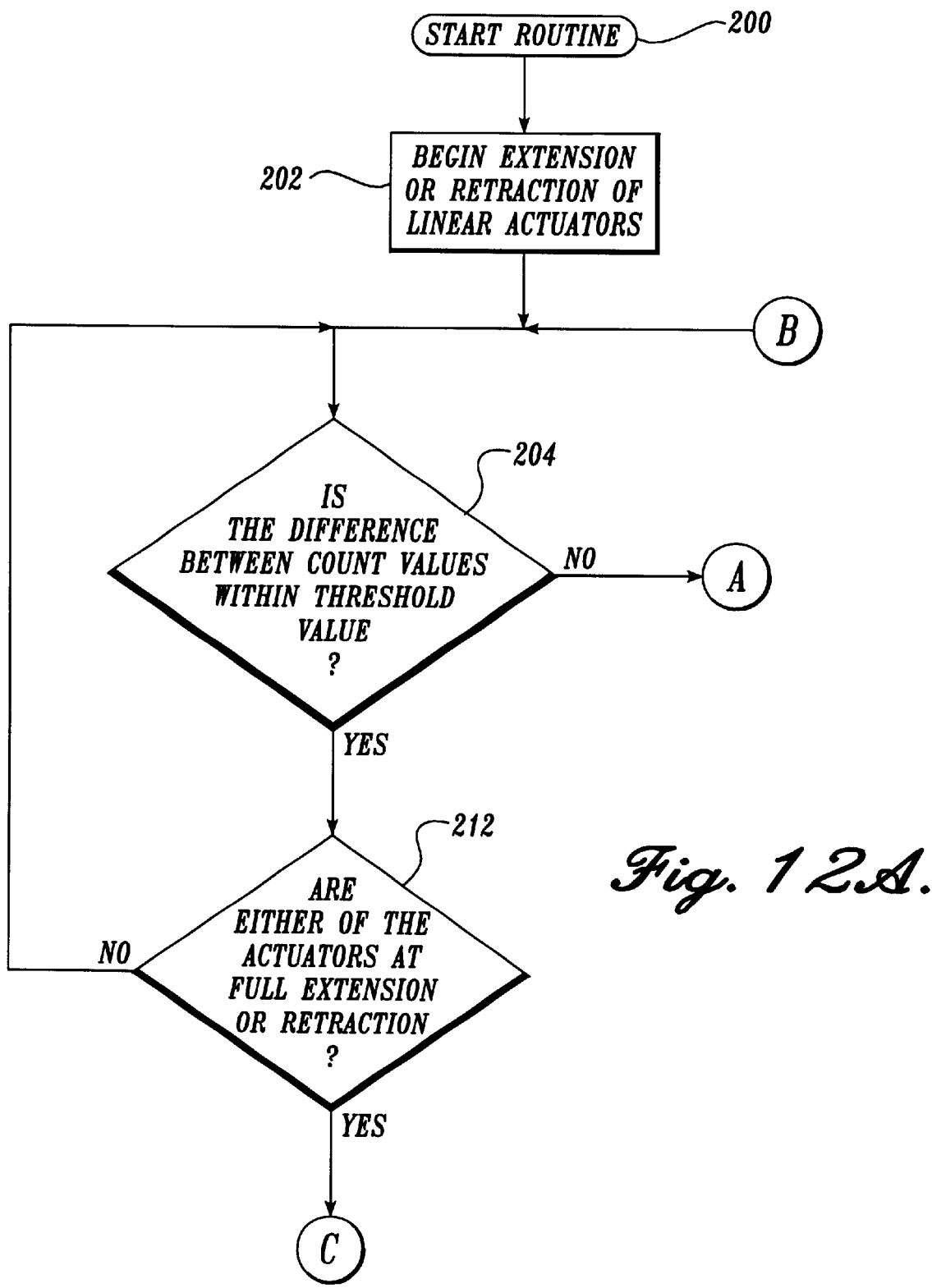
FIGS. 12A–12D illustrate an exemplary embodiment of a process for synchronizing the linear actuators in accordance with aspects of the present invention.
Figure 12B:
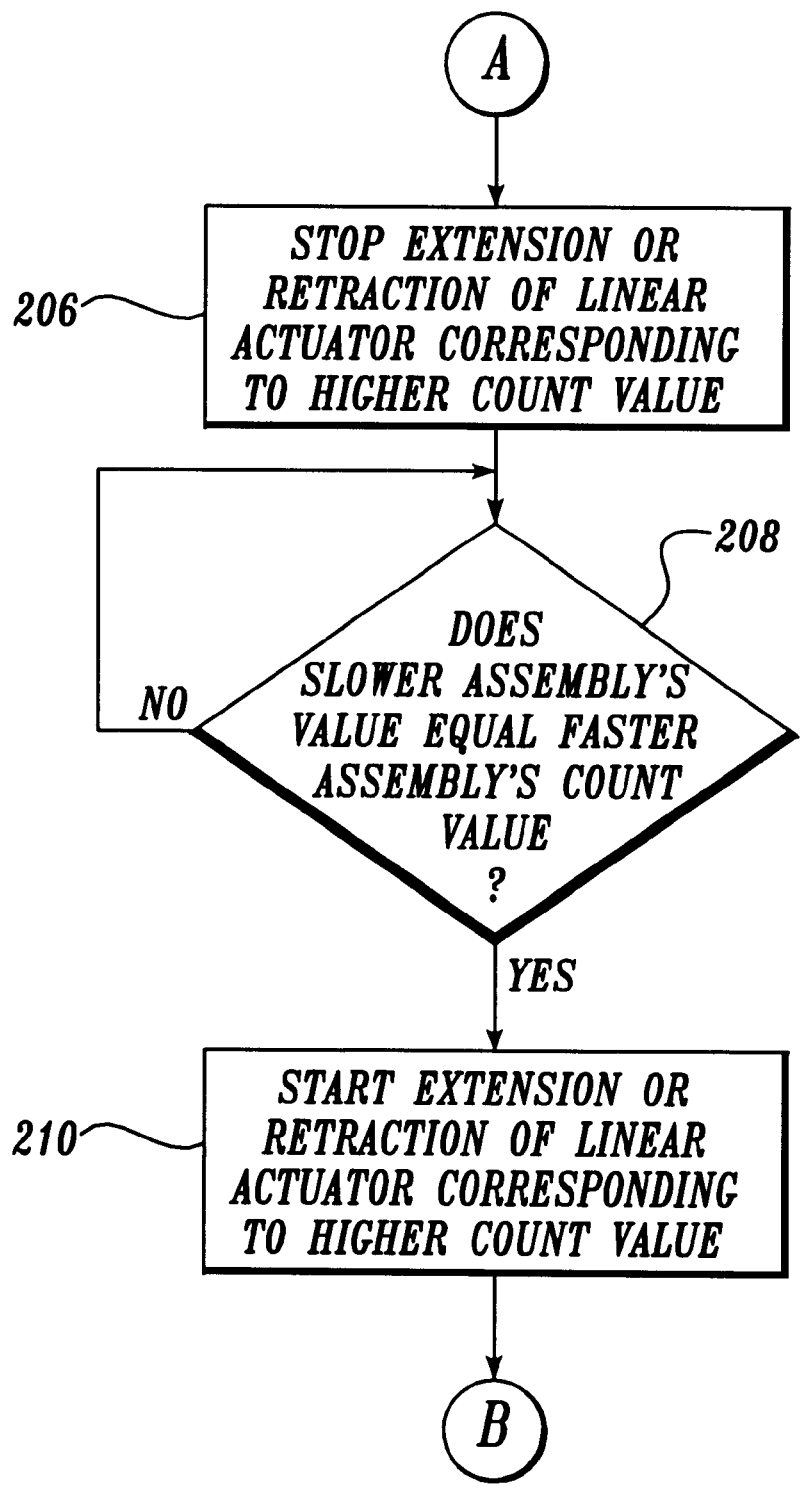

Returning to block 204 in FIG. 12A, if the count values are within the threshold value, the controller 130 then proceeds to determine whether the linear actuators 32 are at a state of full extension/retraction. If the controller 130 determines that neither of the linear actuators 32 are in a state of full extension/retraction at block 212, the process returns to block 204. In response to the test indicating that one of the linear actuators 32 is at full extension/retraction, the controller 130, at block 214, shuts down or stops the linear actuator 32 that has achieved a condition of full extension or retraction (for clarity, this linear actuator will now be referred to as the first actuator). The controller 130 then monitors the other or second actuator at block 216, while still receiving signals or counts from the sensor mechanism 150.

A test is then executed to determine if the second actuator is at full extension/retraction at block 218. If the second actuator is determined to be at full extension/retraction at block 218, the second actuator is shut down at block 226, indicating that both actuators are at full extension/retraction. If the second actuator is determined not to be at full extension/retraction at block 218, a series of tests are run at blocks 220, 222 to determine if an error is present in the system. At block 220, a test is executed to compare the difference in count value between the first and second actuator to the threshold value. In response to the test indicating that the difference in count value is greater than the threshold value, another test is executed at block 222 to determine if an error is present. At block 224, an error signal is displayed if the count value of the second actuator is equal to a maximum error threshold value at block 222 and the second actuator is shut down at block 226. The process returns to block 218, if the results at block 220, 222 are negative.

Figure 12C:
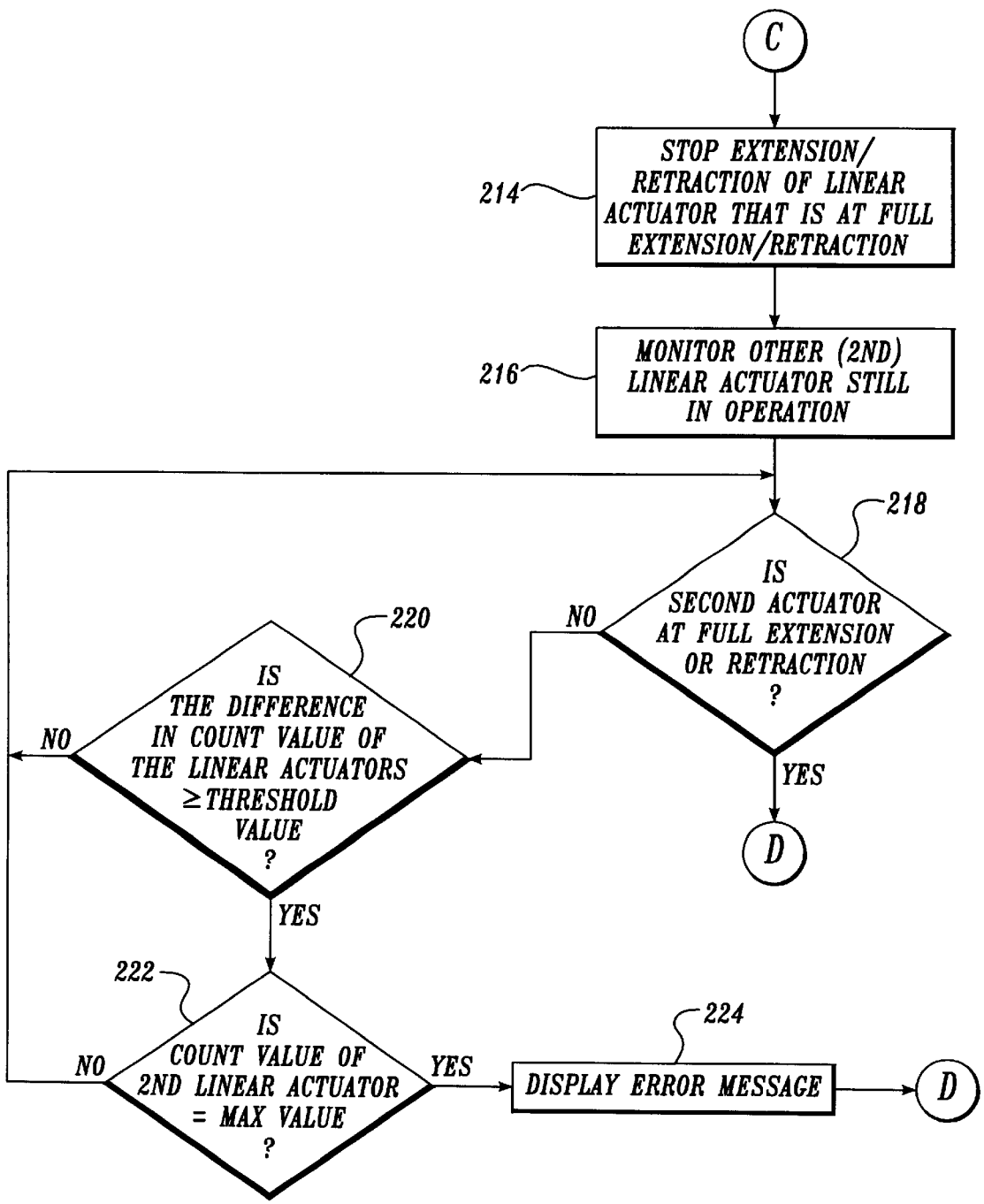
Figure 12D:
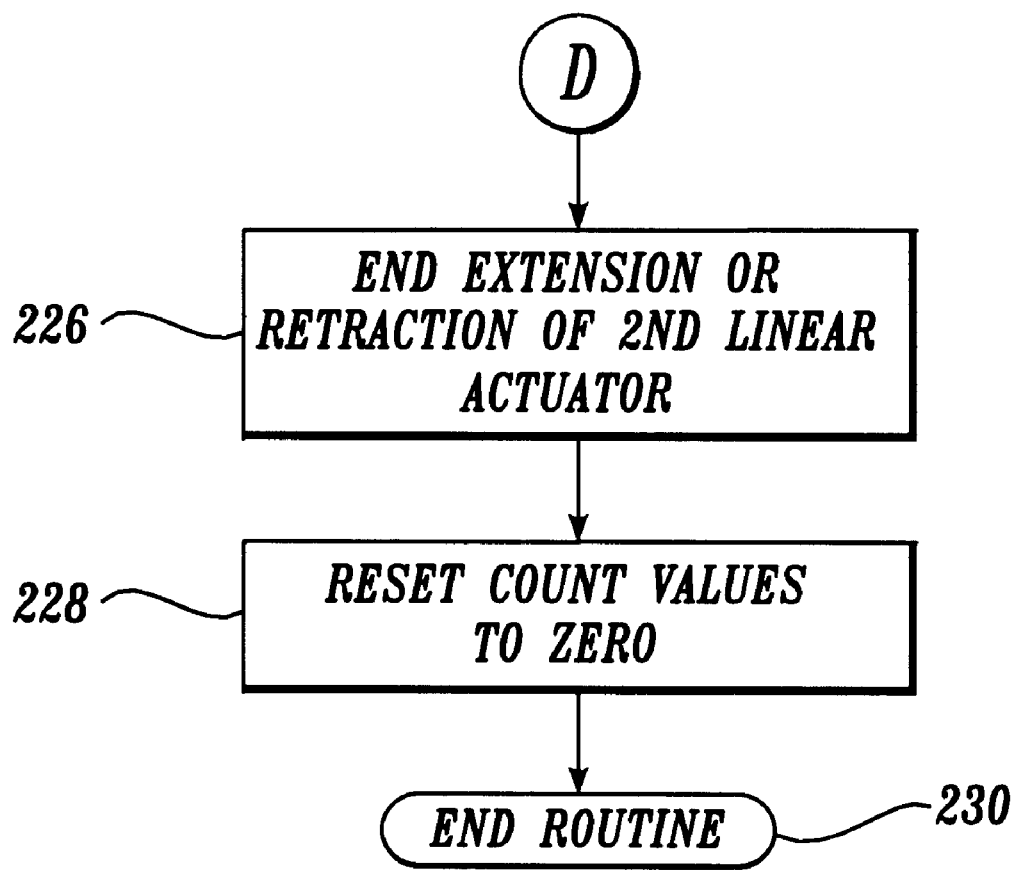

Returning to block 218 in FIG. 12C, after the controller 130 has determined that both actuators are at full extension/retraction, the controller 130 signals the linear actuators 32 to shut down or stop at block 226. After the extension or retraction has stopped, both count values are reset at block 228. The process ends at block 230 after the count values have been reset.

The process illustrated in FIGS. 12A–12D, and described above will now be described with reference to the operation of the present invention. In operation, the user extends or retracts the slide-out room by pushing the appropriately labeled buttons or switches at a control panel (not shown) corresponding to extending or retracting the slide-out room. The controller 130 transmits a signal to each electric motor assembly 120 to begin activation after receiving a signal from the room switch 140. The controller 130 outputs the correct signal to each electric motor assembly 120 according to whether the slide assemblies are to be extended or retracted. As the electric motor assemblies 120 turn the lead screws 42 of the corresponding slide assemblies 58, pulses from each encoder assembly 152 are generated and read by the controller 130. A count corresponding to the number of pulses generated by the encoder assembly 152 of each slide assembly 58 is kept in an internal byte or counter position reserved in memory 134. If one slide assembly 58 extends/retracts faster than the other, the counter position in memory 134 corresponding to the faster assembly will have a higher incremental count value than the slower assembly. The controller 130 then compares whether the difference in count values or the number of on/off iterations between the two slide assemblies 58 is within a threshold value. The threshold value is a predetermined distance of travel represented by a number of counts allowed between the linear actuators so that the slide-out room may be extended/retracted without the possibility of jamming. For example, assume one encoder assembly 152 outputs 8 on/off states or counts over a 1 second period. If the threshold is 3 on/off states or counts, the controller would indicate a violation if the output from the second encoder assembly 152 is below five or above 11 counts.

If the controller 130 determines that the difference between the count values of the slide assemblies is greater than the threshold value, the controller 130 transmits a signal to the electric motor assembly 120 corresponding to the slide assembly 58 having the larger count value to shut down or stop its operation. The controller 130 will continue to monitor the count values of each encoder assembly 152 until the count value of the slower assembly is equal to the count value of the faster assembly. When the count values are equal, the controller 130 transmits a signal to start the electric motor assembly 120 of the faster assembly that had been previously shut down. The slide assemblies 58 then continue to operate together to extend/retract the slide-out room until the controller 130 detects a rise in current supplied to either electric motor assembly 120 or the difference in count values is greater than the threshold described above.

If the controller 130 detects a rise in current in one of the electric motor assemblies by receiving signals from sensor mechanisms 180, this indicates a state where one slide assembly is at full extension or retraction. At this point, the controller 130 shuts down the electric motor assembly 120 having the rise in current. The controller 130 continues to monitor the current and count value of the other electric motor assembly 120 as it extends or retracts. A test is then executed to determine if the other or second slide assembly is at full extension or retraction. If the second slide assembly is determined to be at full extension or retraction because the controller 130 determined a current rise present, the controller transmits a signal to the electric motor assembly 120 of the second slide assembly to shut down or stop. This indicates that both slide assemblies are at full extension or retraction.

If the second slide assembly is determined not to be at full extension or retraction, a series of tests are executed by the controller 130 to determine if an error is present in the system 30. The controller 130 compares the difference in the count values between the first and the second slide assembly to the threshold value. If the controller determines that the difference in the count values is greater than the threshold value, another test is executed to determine if an error is present in the system 30. An error signal is displayed if the controller determines that the count value of the second slide assembly is equal to a maximum error threshold value. When the controller signals an error, it also shuts down the second slide assembly. If the controller determines that each test in negative, the process continues to determine if the second slide assembly is at full extension or retraction.

After the controller 130 has determined that both slide assemblies are at full extension or retraction, the controller 130 signals the slide assemblies 58 to shut down or stop. After the extension or retraction has stopped, both count values in memory 134 are reset.

Figure 13:
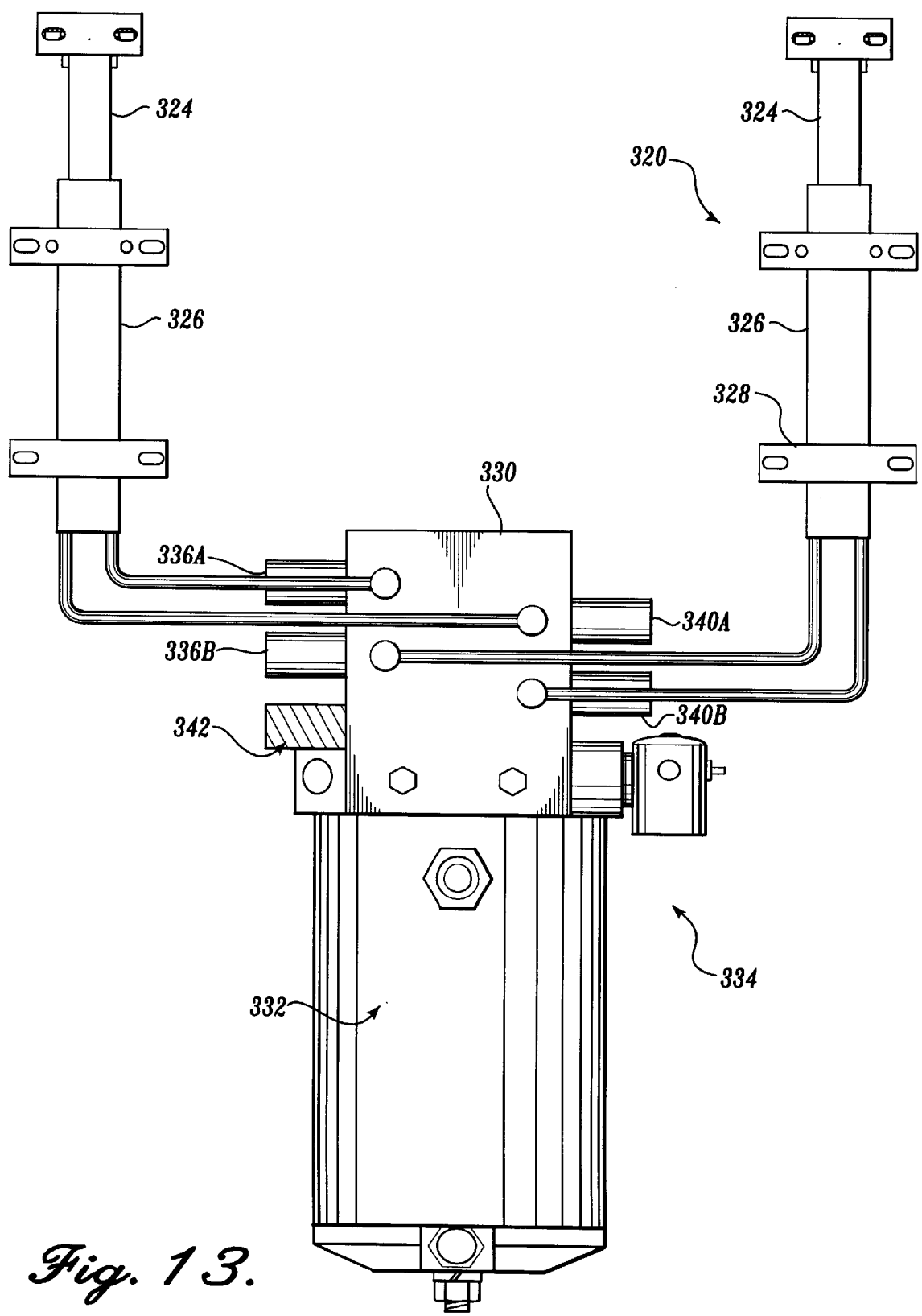
FIG. 13 illustrates an alternative embodiment of the slide assemblies included in the electronic slide-out room synchronization system of the present invention.

According to an alternative embodiment of the present invention, linear actuators 320 shown in FIG. 13 may be used in the electronic slide-out room synchronization system 30 illustrated in FIG. 1 to extend and retract the slide-out room of the recreational vehicle. As shown in FIG. 13, the linear actuators 320 are comprised of two conventional hydraulic cylinders that can be mounted to the chassis of a recreational vehicle shown in FIG. 1. The hydraulic cylinders include an inner tube 324 reciprocally mounted within an outer tube 326. Mounting brackets are secured to the outer tube 326 for attaching to the chassis of the recreational vehicle; however, it should be appreciated other methods could be used to attach the outer tube 326 to the vehicle chassis. The inner tube 324 is coupled to the slide-out room to be extended and retracted. It will be appreciated that. any hydraulic cylinder known in the art may be used to extend and retract the slide-out room, and thus is not described in detail here.

The linear actuators 320 further comprise a manifold 330 that couples the hydraulic cylinders 322 in fluid communication with a pump 332. The pump 332 is in fluid communication with a source of fluid. More particularly, the manifold 330 includes a plurality of solenoid valves 336A, 336B that selectively allow fluid to flow from the manifold 330 to the hydraulic cylinders 322 to extend the inner tube 324, and a plurality of solenoid valves 340A, 340B to selectively allow fluid to flow from the hydraulic cylinders 322 to the manifold 330 when it is desired to retract the inner tube 324. The direction of flow is controlled using a valve 342 provided in the manifold 330. The inner tube, outer tube, manifold, and pump are operably coupled together to form slide assemblies 334.

Figure 14A:
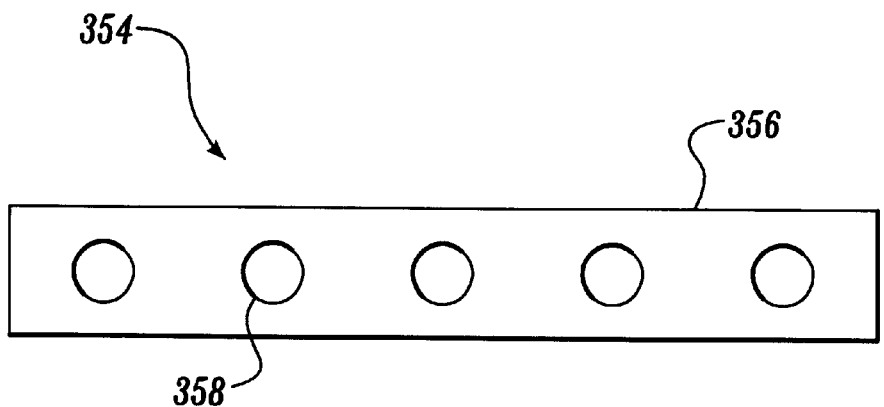
FIGS. 14A–14B illustrate an exemplary sensor mechanism used with the electronic slide-out room synchronization system of the present invention.
Figure 14B:
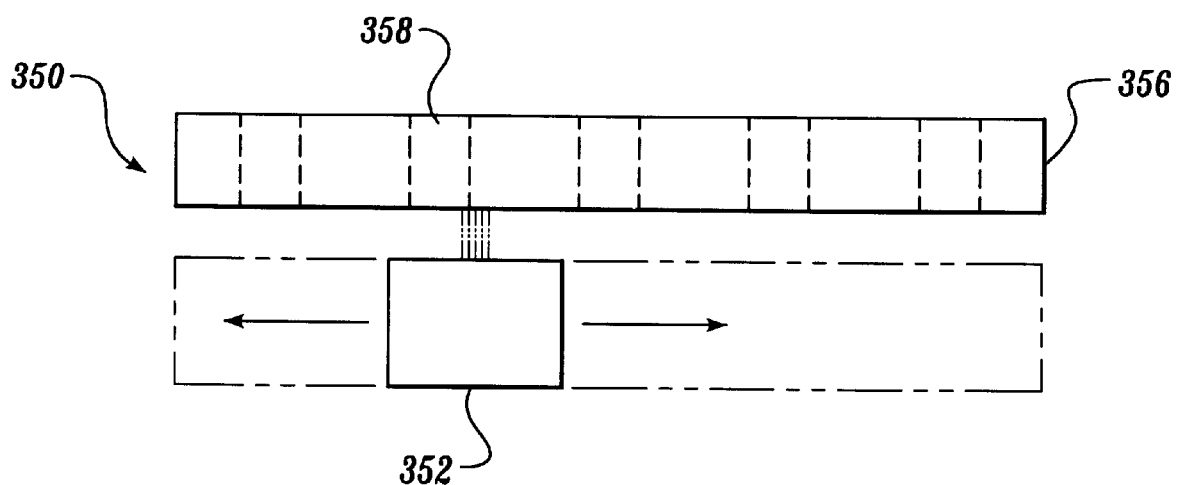
Figure 15:
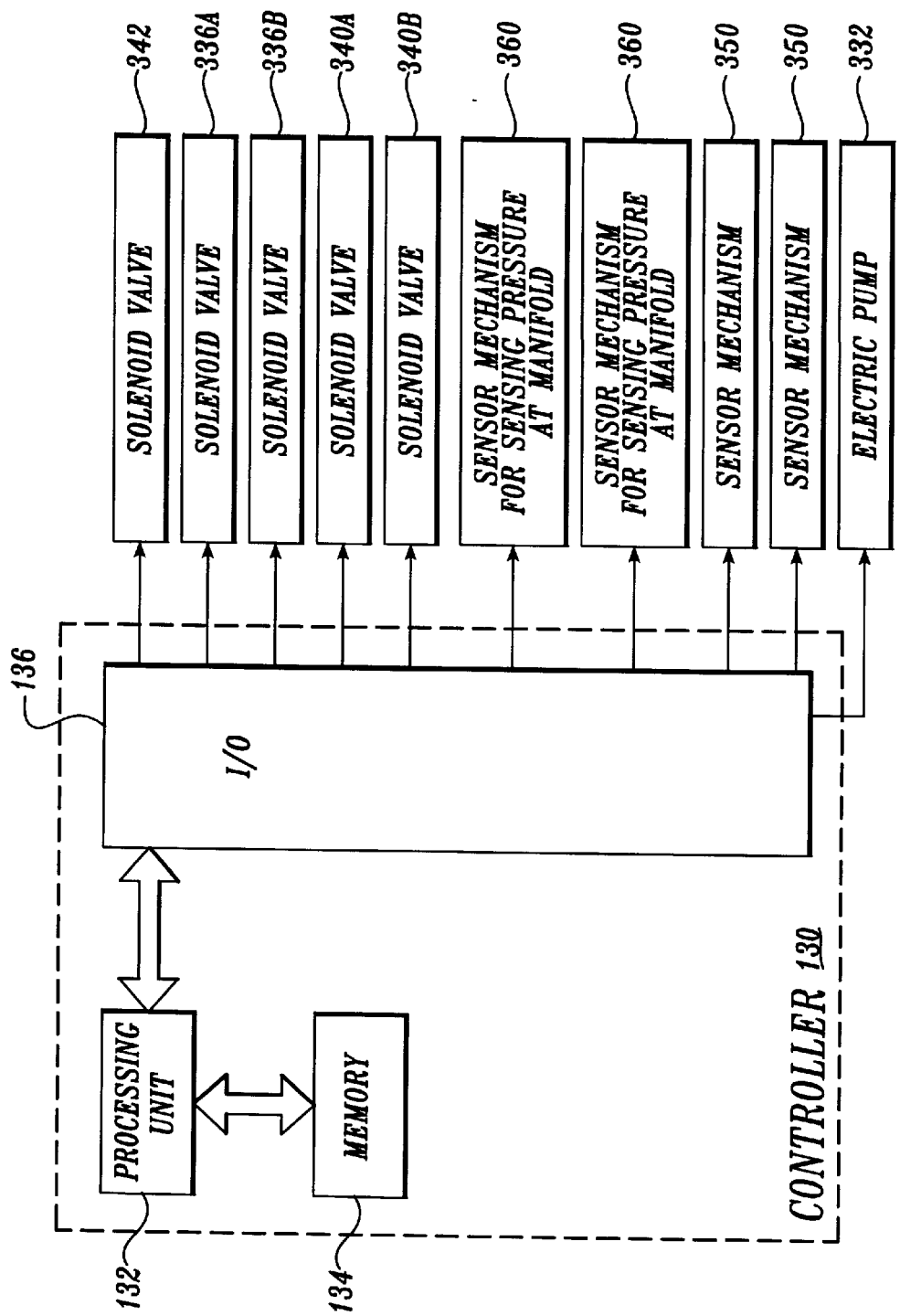
FIG. 15 illustrates a block diagram of the alternative embodiment of the electronic slide-out room synchronization system in accordance with aspects of the present invention.

As shown in FIG. 15, the solenoid valves 336A, 336B, 340A, 340B and pump 332 are in communication with the controller 130 of the electronic slide-out room synchronization system 30. Also in communication with the controller 130 are two sets of sensor mechanisms 350, 360. The first set of sensor mechanisms 350 output a signal to the controller 130 corresponding to the distance of travel of each slide assembly 334. Such sensor mechanisms are well known, and by way of example can include a hall effect type sensor or an optical sensor. In the embodiment of the present invention, shown in FIGS. 14A–B, a hall effect type sensor 352 is used in conjunction with a feed back device 354 to create a pulsed output that may be monitored and counted by the controller 130. The feed back device 354 comprises an elongate strip 356 having a series of apertures 358 disposed therein. The elongate strip 356 may be mounted on the outside of the outer tube 326 of the hydraulic cylinder 322 and the sensors 352 may be mounted to the inner tube 324. See FIG. 13.

The second set of sensor mechanisms 360 output a signal corresponding to the hydraulic manifold pressure occurring at the manifold 330. A rise in pressure is detected by the controller when the slide-out room is at full extension or retraction and is presently known in the art.

The process illustrated in FIGS. 12A–12D, and described above can be use to operate the alternative embodiment of the present invention illustrated in FIGS. 13–15.

It will be appreciated by those skilled in the art and others, the electronic slide-out room synchronization system formed in accordance with the present invention has a number of advantages over the prior art. First, by monitoring and adjusting the distance of travel of the slide assemblies, the system prevents misalignment of the slide-out room during the extension or retraction thereof. Additionally, by allowing one slide assembly to continue to extend or retract after the other slide assembly is at full extension or retraction, the slide-out room may be sealed properly if the slide-out room had not been built square by the manufacturer. This allows the original equipment manufacturer flexibility in the installation of the slide assemblies and the construction of the slide-out room.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for synchronizing the operation of multiple actuators used to extend and retract a slide-out room of a vehicle, the system comprising:

a first slide assembly including a first slide member adapted to be connected to the slide-out room, the first slide member moveable relative to a stationary member of the vehicle along a path of travel between an extended and a retracted position;

a second slide assembly including a second slide member adapted to be connected to the slide-out rooe remote from the first slide member, the second slide member moveable relative to the stationary member of the vehicle along any starting position of the path of travel between an extended and a retracted position;

first and second powered actuators operably coupled to the first and second slide members, respectively, for moving the first and second slide members between extended and retracted positions;

first and second sensors operably associated with the first and second slide members, respectively, the first and second sensors operable for generating signals indicative of the relative position of the first and second slide members at any position along the path of travel between the extended and retracted positions; and a synchronization controller in electrical communiaction with the first and second sensors and the first and second powered actuators, the synchronization controller operable to monitor the generated signals and adjust the relative distance of travel of the slide members so as to enable the slide members to extend or retract in substantial unison to a completed position.

2. A system for synchronizing the operation of multiple actuators used to extend and retract a slide-out room of a vehicle, the system comprising:

a plurality of first members connectable to a frame of the vehicle;

a plurality of second members attachable to the slide-out room, the second members slidably coupled to the first members for movement between a retracted and an extended position;

a plurality of powered actuators operable to move the plurality of second members between the retracted and the extended position; and a sychronization sub-system including a) a controller in communication with the powered actuators, and b) a sensor associated with each of the second members, the sensors in communication with the controller and operable for producing a signal indicative of the relative position of the second members at any position along a path of travel between the retracted and extended positions;

wherein the synchronization sub-system operates to monitor and adjust the relative position of the second members with respect to each other so as to enable the second members to extend or retract at substantially the same rate to a completed position.

3. The system of claim 2, wherein each powered actuator includes a lead screw mechanism operably coupled to an electric motor and coupled to one of the second members, the electric motor operable to rotate the lead screw, which in turn, moves the second members between the retracted and the extended position.

4. The system of claim 3, wherein the synchronization sub-system further includes a slotted disk coupled to each of the lead screws for rotation therewith, the slotted disks operable for rotating within a sensor field generated by the sensors, thereby producing pulsed signals.

5. The system of claim 2, wherein the synchronization sub-system further includes a memory in communication with the controller and operable for storing the signals produced by the sensors and a threshold value.

6. The system of claim 5, wherein the controller is operable for receiving signals from an activation switch, the signals indicative of either extension or retraction, monitoring the extension or retraction of the second members by receiving a signal from the sensor associated with each actuator, and synchronizing the extension or retraction of the second members by determining if the difference between the signals received from the sensors is greater than the threshold value, and if the difference between the signals is greater than the threshold value then terminating the operation of the actuator associated with the larger signal value.

* * * * *

UNITED STATES PATENT AND TRADEMARK OFFICE
CERTIFICATE OF CORRECTION

PATENT NO. : 6,471,275 B1
DATED : October 29, 2002
INVENTOR(S) : J.R. Kunz et al.

It is certified that error appears in the above-identified patent and that said Letters Patent is hereby corrected as shown below:

Column 11,
Line 5, "rooe" should read -- room --
Line 21, "communiaction" should read -- communication --

Signed and Sealed this

Eighteenth Day of March, 2003

JAMES E. ROGAN
*Director of the United States Patent and Trademark Office*